(12) United States Patent
Sunnucks

(10) Patent No.: US 7,918,929 B2
(45) Date of Patent: Apr. 5, 2011

(54) WATER ERODIBLE DENTURE ADHESIVE

(76) Inventor: John Christopher Sunnucks, Allen, TX (US)

( * ) Notice: Subject to any disclaimer, the term of this patent is extended or adjusted under 35 U.S.C. 154(b) by 520 days.

(21) Appl. No.: 12/070,492

(22) Filed: Feb. 19, 2008

(65) Prior Publication Data

US 2009/0205534 A1    Aug. 20, 2009

(51) Int. Cl.
*A61C 13/23* (2006.01)
*C09J 105/00* (2006.01)
*C09J 103/02* (2006.01)

(52) U.S. Cl. .............. 106/35; 106/205.72; 433/180

(58) Field of Classification Search .......... 106/35, 106/205.72; 433/180
See application file for complete search history.

(56) References Cited

U.S. PATENT DOCUMENTS

| | | | | |
|---|---|---|---|---|
| 2,338,416 A | * | 1/1944 | Fales | 424/60 |
| 5,308,636 A | * | 5/1994 | Tye et al. | 426/573 |
| 5,760,102 A | * | 6/1998 | Hall et al. | 523/120 |
| 6,258,342 B1 | * | 7/2001 | Harcum et al. | 424/49 |
| 2005/0227902 A1 | * | 10/2005 | Erazo-Majewicz et al. | 510/470 |
| 2006/0213396 A1 | * | 9/2006 | Kamohara et al. | 106/157.2 |
| 2007/0298090 A1 | * | 12/2007 | Chen et al. | 424/448 |
| 2009/0232911 A1 | * | 9/2009 | Kato et al. | 424/725 |

OTHER PUBLICATIONS

Pardons et al, "Stabilizing Marine Oils with Natural Antioxidants", Nutraceutical Business and Teachnology, (Jul. 2007).*

Hosmani, "Carbopol and Its Pharmaceutical Significance: A Review", Latest Reviews, (Feb. 2006).*

* cited by examiner

*Primary Examiner* — David M Brunsman
(74) *Attorney, Agent, or Firm* — Jeffrey Roddy

(57) ABSTRACT

A non-toxic water erodible denture adhesive incorporating a starch portion and a polysaccharide portion whereby a elastomeric paste of excellent bioadhesiveness and adhesion to smooth surfaces is obtained; and which is found to have excellent thin film forming properties and is water erodible facilitating easy removal from denture recesses as well as the intraoral cavity.

13 Claims, 1 Drawing Sheet

WATER ERODIBLE DENTURE ADHESIVE

CROSS REFERENCE TO RELATED APPLICATIONS

None

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

Gum based adhesives based on vegetable gums such as xanthan, karaya, tragacanth and acacia were some of the first denture adhesive materials to be developed, and are characterized by modest adhesion to both the dentures and oral mucosa. More recent developments feature denture adhesives commonly containing mixtures of the salts of carboxymethylcellulose and so-called Gantrez polymers; (poly[vinyl methyl ether maleate]) or Polyvinyl alcohol-methyl acrylate copolymer, where the ingredients are then combined with binders (mineral oil, petrolatum and polyethylene oxide), oil based flavoring agents and methyl or poly-paraben as preservatives. Non-toxic naturally derived alternatives have been described as well: U.S. Pat. No. 5,760,102 to Hall, et al. describes a method of preparing a denture adhesive composition containing a chemical substance derived from *aloe* leaf.

While these products work for their intended use, they are not without disadvantages. Certain gums such as Karaya have been known to cause allergic reactions, and to lower the intraoral pH creating a damaging environment for teeth and increased susceptibility to dental caries. While synthetic (Gantrez type) denture adhesives offer a better performance than the gum based alternatives, they are difficult to remove from the dentures and oral mucosa using only water. They also tend to separate out into constituents of thin and thick viscosities in the tube which can lead to premature hardening of the formulation and product waste. Furthermore, while not intended for ingestion, many denture adhesive users are of advanced age and may swallow a portion. The health effects of ingesting small amounts of denture adhesive over extended periods are not well understood; however, an association between prolonged use of zinc containing denture adhesives and neuropathy has been described; Neerman, et al. "Neuropathy Following Chronic Use of Denture Adhesive in a 40-Year-Old Patient," Laboratory medicine, vol. 38, (2007): no. 10. Heretofore, denture compositions described containing *aloe* evidence a low initial pH that can be problematic insofar as a pH below 6.5 is known to degrade hydroxyapatite.

An ideal denture adhesive therefore should be non-toxic (even if swallowed), non-irritating and easy applied and removed; the constituents should not separate in the package over time. Further desirable characteristics would be thin film forming properties, a neutral or slightly basic pH so as not to promote demineralization of tooth enamel and a resistance to fermentation; whereby an acidic environment is created by the oral microflora.

Resistant Starch

So called high amylose or resistant starch is a type of starch that resists digestion in the small intestine. High amylose corn starch (HACS) has a higher ratio of amylose to amylopectin (1:1) than conventional corn starch (1:4). Currently three categories of resistant corn starch are commercially available: Class V (50% amylose), Class VII (70% amylose) and Class IX (90% amylose). These types of resistant corn starches are classified as RS2, meaning that they occur in a naturally granulated form and share this classification with uncooked potato and green banana flour. Unique adhesive and moisture resistant properties of HACS are thought due to the helical non-branching structure of amylose, and described in patents for the packaging industries, specifically for the production of corrugated cardboard:

U.S. Pat. No. 4,787,937 to Leake described the use of an improved corrugating adhesive which is a mixture of raw uncooked tapioca starch and gelatinized hi-amylose starch.

U.S. Pat. No. 5,236,977 to Eden et al. describe the uses of gelantanized hi-amylose starch to improve the tack and green strength of corrugating adhesives.

U.S. Pat. No. 5,393,336 describes the use of hi-amylose starch as the ungelatinized raw starch component in a mixture of cooked starch to produce an adhesive with a high level of water resistance and green bond strength.

Glucomannan Hemicelluloses

Soluble partially acetylated glucomannans (GM), a type of hemicellulose, occur as constituents of bulbs, tubers, roots, seeds and the leaves of some non-gramineous monocotyledons such as the genus *Aloe* and in the tubers of the *Amorphophallus kojac* plant. They take the form of linear acetylated mucilaginous polysaccharides comprising 1,4-β-linked D-glucosyl and D-mannosyl. The inner gel of the *Aloe* (*Aloe barbadensis* (Miller)) plant has a Glc:Man ratio of about 1:2, while the Konjac (*Amorphophallus kojac*) has a ratio of about 1:1.6. A. Ebringerova et al. "Hemicellulose" Journal of Advanced Polymer Science 186 (2005): 1-67. Acemannan Hydrogel™ a product of Carrington Laboratories, Irving Tex., contains acetylated glucomannan; the first standardized commercially available material derived from raw *aloe*, and the subject of many studies suggesting various therapeutic effects in wound healing and as part of a bioadhesive drug delivery system; U.S. Patent Application 20070298090 (Chen et al.). The use of complex carbohydrates and specifically acemannan, as a possible denture adhesive has been described. Tello et al. "In vitro evaluation of complex carbohydrate denture adhesive formulations" Quintessence International; vol. 29, issue 9, (1998):

Both types of glucomannan have been recognized for their thin film forming characteristics which is highly desirable for denture adhesives because thick films may displace the denture.

U.S. Pat. No. 5,308,636 to Tye et al. describes enhanced gelatinization of starch with the addition of a glucomannan with improved cling to smooth surfaces such as poultry, fish and vegetables.

U.S. Pat. No. 5,358,559 to Fitt et al describes enhancement of a starch based adhesive with the addition of a hemicellulose.

BRIEF SUMMARY OF THE INVENTION

A denture adhesive composition and method of preparing the same where the composition is a mixture of a resistant starch portion to which is added a mucilaginous polysaccharide portion that combined with the resistant starch is thought to form a composite gel with the resistant starch existing as a continuous phase while the mucilaginous polysaccharide is dispersed as a sol in the network of the resistant starch. When mixed at room temperature (15° C. to 30° C.) with distilled water the composition forms quickly to a mayonnaise like consistency with tensile strength exceeding either component singly. It was found that the hi-amylose corn starch combined with *aloe* or konjac mannon powder and water to form what is believed to be a composite gel demonstrating comparable adhesiveness to gantrez type denture adhesives, while having high resistance to syneresis and hardening over time. Another benefit was the amylase resistant hydrocolloid formed by the hi-resistant corn starch which resists microbial fermentation, a leading cause of intraoral acid conditions.

The unset composition is readily extrudable, may be packaged in tube form and exhibits no hardening or syneresis over time in storage. Once applied intraorally, the instant invention exhibits excellent bio-adhesiveness and adhesion to smooth surfaces such as a denture or partial plate; the paste expands minimally forming a desirable thin film upon setting, adhering the dentures to the gums.

The mixture of resistant starch and glucomannan was found to have excellent water resistance, thin film forming properties, adhesivenes and firmness upon setting compared to a mixture substituting unmodified starch.

High amylose content starch naturally forms an amylase resistant hydrocolloid thus resisting acid producing fermentation by microflora in the intraoral cavity Standardized high resistant starches such as HI-Maize® resistant corn starch are available from the National Starch Company and work well as the starch portion of the present formulation. Standardized bulk acetylated glucomannan from konjac is readily available form a number of commercial resources, as is *aloe* vera gel in powdered (freeze dried) such as Manapol® produced by Carrington Laboratories.

One object of the present invention is to provide a therapeutic non-irritating denture paste that is easily applied and dimensionally stable.

Another object of the present invention is to provide a denture adhesive that is non-toxic and hypoallergenic with comparable tensile strength to synthetic denture adhesives.

A further object of the present invention is to provide a denture adhesive that is convenient to apply and readily cleans from the gums or dentures with the application of water at room temperature.

Still another object of the present invention is to provide a composition that has an initial pH equaling or exceeding 6.5.

Yet another object of the present invention is to provide a composition that resists syneresis (and thus hardening) in packaging over time.

Other objects and advantages of the present invention will become apparent from the following descriptions, taken in connection with the accompanying chart wherein by way of illustration and example, a preferred embodiment of the present invention is disclosed.

DETAILED DESCRIPTION

Figure 1:
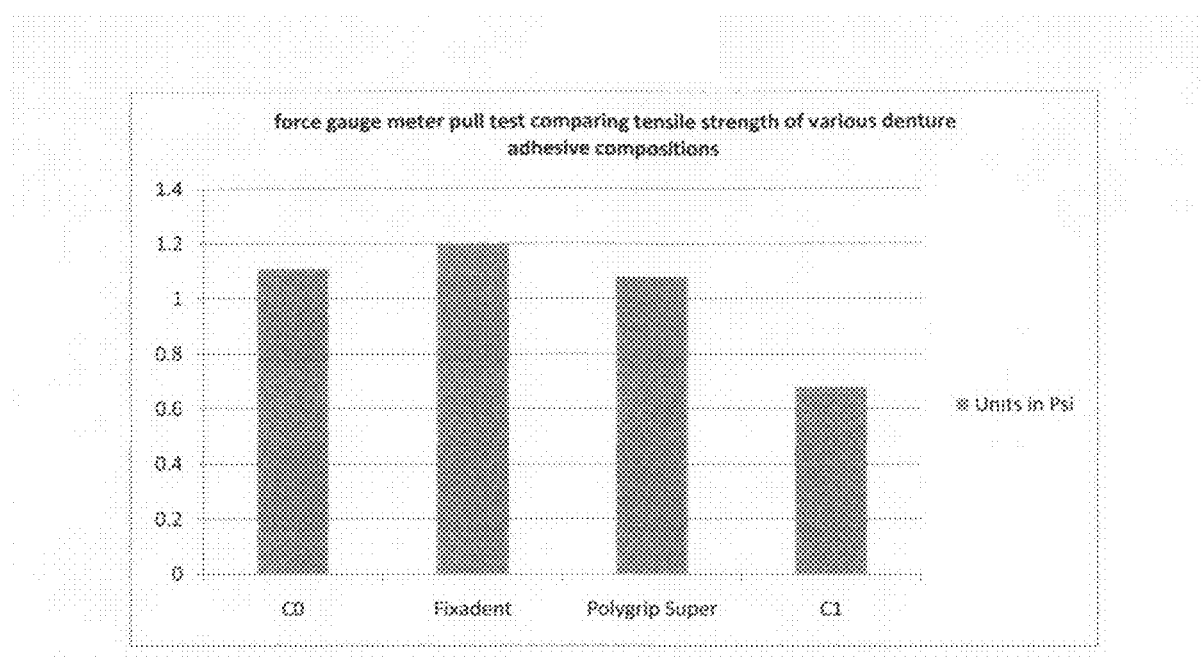
FIG. 1 chart comparing the adhesiveness (tensile strength) of the present composition and two commercial products and a control of re-hydrated *aloe* powder containing at least 1% polysaccharide solids.

The present invention is a composition combining a complex carbohydrate; preferably a starch of at least 50% amylose content; and more preferably between 70% and 90% amylose content, to which is added a hemicellulose; specifically a glucomannan having linear acetylated mucilaginous polysaccharides comprising 1,4-β-linked D-glucosyl and D-mannosyl residues. Preferably the glucomannan is derived from the inner gel of the *Aloe barbadensis* (Miller) plant in the form of freeze dried *aloe* gel, although the glucomannan fraction from konjac (*Amorphophallus kojac*) plant is also suitable. A preservative and anti-microbial agent may be added as well as a anti-fungal and anti-oxidant without affecting the adhesiveness of the formulation. Conceivably, a food safe thickening agent (carbomer) such as Carbopol 910 or Carbopol 940 may be added where additional adhesiveness is required in individuals having insufficient saliva production.

FIG. 1. Illustrates the results of a pull test using a force gauge meter averaged over a series of five pulls with the results given in psi as follows: instant invention (C0) (1.11), Fixadent® (1.20), Polygrip Super® (1.08) and a control, (C1) being a glucomannan gel with 0.5% polysaccharide (solids) content.

The following non-limiting examples are given to illustrate the preparation of the present composition.

Example 1

450 grams hi-resistant corn starch powder 50 grams pharmaceutical grade glucomannan powder at room temperature mix powders with 500 ml distilled water to obtain a composite gel of between 4000 and 100,000 (cP); to this adding a sweetening agent such as Spenda®

Example 2

Pre-hydrate 50 grams pharmaceutical grade glucomannan powder with 450 ml distilled water to obtain a homogeneous solution, adding 500 grams hi-resistant corn starch powder and mixing at room temperature with distilled water to obtain a composite gel having a viscosity between 4000 and 100,000 (cP); to this adding a sweetening agent such as Spenda®

Example 3

Create 500 ml homogeneous solution of Manapol® (Carrington Laboratories) and water consisting of between 5 percent and 10 percent polysaccharide solids; to this add 500 grams of hi-resistant corn starch powder and mix well at room temperature to obtain a composite gel having a viscosity of between 4000 and 100,000 (cP); to this adding a sweetening agent such as Spenda®

Example 4

Pre-hydrate 50 grams pharmaceutical grade glucomannan powder with 450 ml distilled water, adding 500 grams hi-resistant corn starch powder and mixing at room temperature with distilled water sufficient to obtain a composite gel having a viscosity between 4000 and 100,000 (cP); to this adding precipitated calcium carbonate as a buffering agent (10-50 grams).

Example 5

Pre-hydrate 10 grams pharmaceutical grade glucomannan powder with 490 ml distilled water, adding 500 grams hi-resistant corn starch powder and mixing at room temperature with distilled water sufficient to obtain a composite gel having a viscosity between 4000 and 100,000 (cP); to this adding precipitated calcium carbonate as a buffering agent (10-50 grams).

Example 5

Pre-hydrate 10 grams pharmaceutical grade glucomannan powder with 490 ml distilled water, adding 500 grams hi-resistant corn starch powder and mixing at room temperature; to this adding precipitated calcium carbonate as a buffering agent (10-50 grams); and further adding carbopol 940 to achieve a composite gel having a viscosity between 4000 and 200,000 (cP);

Evaluation of High Resistant Starch and Glucomannan Composition

Methodology: A sample of each denture adhesive was spread in a smooth layer of 1.5 mm between two flat matching circular stainless plates each having a 1 square inch surface area. The samples were dry tested by measuring the force in psi required to separate the plates (breaking stress) with a digital force gauge meter connected to a vertical stand and where the cabling attachment was attached to the top plate by means of a cable and 'S' hook. The force gauge meter was moved upward at a rate of 0.5 mm/sec until separation of the plates was noted. In the past others have obtained various results using other methodologies, however for our purposes we are concerned primarily with the relative adhesiveness of each composition.

While the invention has been described by the examples given, it is not intended to limit the scope of the invention to the particular form set forth, but on the contrary, it is intended to cover such alternatives, modifications, and equivalents as may be included within the spirit and scope of the invention as defined by the appended claims.

I claim:

1. A water erodible denture adhesive composition comprising:
    a) a mixture of a high amylose corn starch and an *aloe* glucomannan in respective weight ratios of 9-10:1, and water, blended at a temperature of between 15-30 degrees Celsius,
    b) the mixture resulting in a composite gel wherein the corn starch exists as a continuous phase and the glucomannan exists as a sol; and
    c) psi wherein, without additional heating, the resulting composite gel has a viscosity from 4000-100,000 cp; and has a pH value of at least 6.5.

2. The denture adhesive composition according to claim 1, wherein said glucomannan is obtained from the inner gel of the *Aloe barbadensis* (Miller) plant.

3. The denture adhesive composition according to claim 1, wherein said corn starch is at least 70% amylose by weight.

4. The denture adhesive composition according to claim 1, wherein said corn starch is at least 90% amylose by weight.

5. The denture adhesive composition according to claim 1, wherein said glucomannan is in freeze dried powder form consisting of linear activated mucilaginous polysaccharides comprising 1,4-β-linked D-glucosyl and D-mannosyl residues.

6. The denture adhesive composition according to claim 1, to which is added a water soluble flavoring agent.

7. The denture adhesive composition according to claim 1, to which is added a sweetening agent selected from the group consisting of xylose, ribose, glucose, mannose, galactose, fructose, dextrose, sucrose, maltose, corn syrup, sorbitol xylitol, mannitol, maltitol, saccharin, cyclamate, sucralose, aspartame.

8. The denture adhesive composition according to claim 1, blended together by one or more of the following: stirring, agitation, mechanical mixing, shaking.

9. The denture adhesive composition according to claim 1, to which an antioxidizing agent is added which is selected from the group consisting of citric acid, sodium hydroxylate, mixed tocopherols, rosemary extract.

10. The denture adhesive composition according to claim 1, to which a mold inhibitor is added which is selected from the group consisting of potassium sorbate, propionic acid, sorbic acid, calcium propionate.

11. The denture adhesive composition according to claim 1, to which is added the buffering agent calcium carbonate.

12. The denture adhesive composition according to claim 1, to which is added a carbomer.

13. A method of preparing a water erodible denture adhesive composition comprising the steps of:
    a) blending a mixture of a high amylose corn starch and an *aloe* glucomannan in respective weight ratios of 9-10:1, and water, at a temperature of 15-30 degrees Celsius,
    b) the mixture resulting in a composite gel wherein the corn starch exists as a continuous phase and the glucomannan exists as a sol;
    c) wherein, without additional heating, the resulting composite gel has a viscosity from 4000-100,000 cp; and has a pH value of at least 6.5.

* * * * *